United States Patent
Ozawa et al.

(10) Patent No.: US 9,356,992 B2
(45) Date of Patent: May 31, 2016

(54) TRANSFER CONTROL DEVICE, NON-TRANSITORY COMPUTER-READABLE STORAGE MEDIUM STORING PROGRAM, AND STORAGE APPARATUS

(71) Applicant: FUJITSU LIMITED, Kawasaki-shi (JP)

(72) Inventors: Toshihiro Ozawa, Yokohama (JP); Kazutaka Ogihara, Hachioji (JP); Yasuo Noguchi, Kawasaki (JP); Tatsuo Kumano, Kawasaki (JP); Masahisa Tamura, Kawasaki (JP); Jun Kato, Kawasaki (JP); Ken Iizawa, Yokohama (JP); Kazuichi Oe, Yokohama (JP); Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 256 days.

(21) Appl. No.: 13/722,331

(22) Filed: Dec. 20, 2012

(65) Prior Publication Data
US 2013/0246580 A1 Sep. 19, 2013

(30) Foreign Application Priority Data
Mar. 16, 2012 (JP) ................................. 2012-061037

(51) Int. Cl.
*G06F 15/16* (2006.01)
*H04L 29/08* (2006.01)

(52) U.S. Cl.
CPC ............ *H04L 67/06* (2013.01); *H04L 67/1097* (2013.01)

(58) Field of Classification Search
CPC ........................... H04L 67/06; H04L 67/1097
See application file for complete search history.

(56) References Cited

U.S. PATENT DOCUMENTS

| | | | |
|---|---|---|---|
| 7,024,451 B2 * | 4/2006 | Jorgenson | 709/203 |
| 7,085,855 B1 * | 8/2006 | Sato et al. | 709/253 |
| 7,140,044 B2 * | 11/2006 | Redlich et al. | 726/27 |
| 7,161,940 B2 * | 1/2007 | Jinzaki | 370/390 |
| 7,171,493 B2 * | 1/2007 | Shu et al. | 709/246 |
| 7,222,133 B1 * | 5/2007 | Raipurkar et al. | 707/642 |
| 7,249,204 B2 * | 7/2007 | Sato et al. | 710/33 |
| 7,249,237 B2 * | 7/2007 | Kusumi | 711/170 |

(Continued)

FOREIGN PATENT DOCUMENTS

| | | |
|---|---|---|
| JP | 2006-185019 | 7/2006 |
| JP | 2011-159242 | 8/2011 |
| JP | 2011-215794 | 10/2011 |

OTHER PUBLICATIONS

Kunkle et al., A load balancing framework for clustered storage systems, P. Sadayappan et al. (Eds.): HiPC 2008, LNCS 5374, pp. 57.72, 2008. Springer-Verlag Berlin Heidelberg 2008.*

*Primary Examiner* — Ario Etienne
*Assistant Examiner* — Thorne E Waugh
(74) *Attorney, Agent, or Firm* — Fujitsu Patent Center (57) ABSTRACT

A transfer data block is selected, and a data file including the transfer data block is selected as a transfer data file. All the data blocks of the transfer data file are added to the transfer data block. When all the data files including each transfer data block is selected as a transfer data file, the transfer data block is selected as a deletion data block. When a total data amount of the deletion data block is larger than or equal to a predetermined target deletion data amount and a ratio of a total data amount of the transfer data block to the total data amount of the deletion data block is smaller than or equal to a predetermined value, the data file is transferred from a transfer source node to a transfer destination node. Accordingly, a storage can be used efficiently.

6 Claims, 7 Drawing Sheets

(56) References Cited

U.S. PATENT DOCUMENTS

| | | | |
|---|---|---|---|
| 7,430,618 B2* | 9/2008 | Ishida et al. | 710/5 |
| 7,590,765 B2* | 9/2009 | Nagao et al. | 710/5 |
| 2008/0201336 A1* | 8/2008 | Yamato | 707/10 |
| 2010/0169587 A1* | 7/2010 | Atluri et al. | 711/155 |
| 2011/0191396 A1 | 8/2011 | Taki | |
| 2011/0246643 A1* | 10/2011 | Kubota | 709/224 |

* cited by examiner

TRANSFER CONTROL DEVICE, NON-TRANSITORY COMPUTER-READABLE STORAGE MEDIUM STORING PROGRAM, AND STORAGE APPARATUS

CROSS-REFERENCE TO RELATED APPLICATION

This application is based upon and claims the benefit of priority of the prior Japanese Patent Application No. 2012-061037, filed on Mar. 16, 2012, the entire contents of which are incorporated herein by reference.

FIELD

The embodiments discussed herein are directed to a transfer control device, a computer-readable recording medium storing a program, and a storage device.

BACKGROUND

Recently, a distributed storage system including a plurality of server nodes has been realized in order to accumulate a large amount of data. In a distributed storage system, with data accumulation, an amount of data accumulated in each node may be biased.

For this reason, by transferring data accumulated in each node between nodes, data relocation is performed to equalize data amounts between the nodes.

By performing data relocation, it may be possible to prevent the storage depletion of some nodes caused by data biasing, and the performance degradation caused by the concentration of access on a specific node.

[Patent Literature 1] Japanese Laid-open Patent Publication No. 2011-215794

[Patent Literature 2] Japanese Laid-open Patent Publication No. 2011-159242

In a conventional distributed storage system, it is required to perform data equalization by performing data relocation in order to use a storage efficiently.

SUMMARY

In a conventional distributed storage system, it is required to perform data equalization through data relocation in order to use a storage efficiently.

In one aspect, the embodiments discussed herein are directed to the efficient use of a storage.

Note that, the invention is not limited to the above objects, and it may be regarded as another object of the invention to achieve function effects that are derived from respective elements described in embodiments of the invention described later, but cannot be obtained by the conventional technologies.

Therefore, the transfer control device, which selects a data file among a plurality of data files and transfers the data file from a transfer source node to a transfer destination node, includes: a transfer data block selection unit that selects a transfer data block to be transferred to the transfer destination node among a plurality of data blocks generated by splitting the data file; a transfer data file selection unit that selects a data file, including the transfer data block selected by the transfer data block selection unit, as a transfer data file; a transfer data block addition unit that adds entire data blocks, included in the transfer data file selected by the transfer data file selection unit, to the transfer data block; a deletion data block selection unit that, selects the transfer data block as a deletion data block, when all the data files including the transfer data block are selected as the transfer data file by the transfer data file selection unit; and a transfer processing unit that transfers the data file from the transfer source node to the transfer destination node by storing the transfer data block in the transfer destination node and deleting the deletion data block from the transfer source node.

Further, the computer-readable recording medium stores a program for selecting a transfer data block to be transferred from a transfer source node to a transfer destination node among a plurality of data blocks generated by splitting a data file; selecting a data file including the selected transfer data block as a transfer data file; adding all the data blocks included in the selected transfer data file to the transfer data block; when all the data files including each transfer data block are selected as the transfer data file, selecting the transfer data block as a deletion data block; and transferring the data file from the transfer source node to the transfer destination node by storing the transfer data block in the transfer destination node and deleting the deletion data block from the transfer source node.

Furthermore, the storage device includes: a data storage unit capable of storing a data file; a de-duplication unit that generates a plurality of data blocks by splitting the data file, performs de-duplication between the generated data blocks, and stores the de-duplicated data blocks in the data storage unit; a transfer data block selection unit that selects a transfer data block to be transferred to a transfer destination node among the plurality of data blocks; a transfer data file selection unit that selects a data file, including the transfer data block selected by the transfer data block selection unit, as a transfer data file; a transfer data block addition unit that adds all the data blocks, included in the transfer data file selected by the transfer data file selection unit, to the transfer data block; a deletion data block selection unit that, selects the transfer data block as a deletion data block, when all the data files including the transfer data block are selected as the transfer data file by the transfer data file selection unit; and a transfer processing unit that transfers the data file from a transfer source node to the transfer destination node by storing the transfer data block in the transfer destination node and deleting the deletion data block from the transfer source node.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of a transfer control device, a program, and a storage device according to the invention will be described with reference to the drawings. However, the embodiments described below are merely exemplary and are not intended to exclude application of various modifications and technologies that are not explicitly described herein. That is, the embodiments may be variously modified and implemented without departing from the purports of the embodiments. Further, the drawings are not intended to include only elements illustrated in the drawings, but may include other functions or the like.

(A) Configuration

Figure 1:
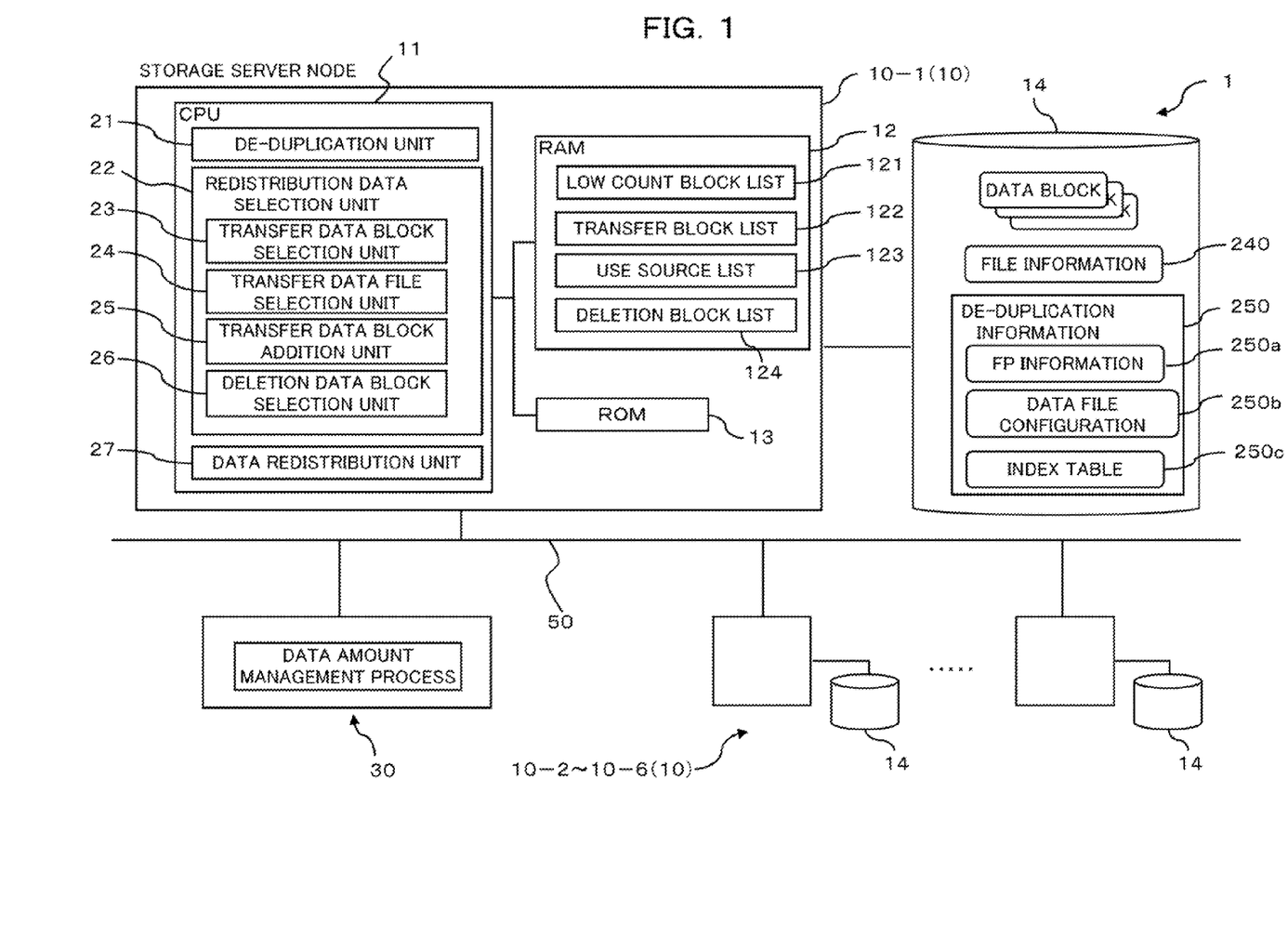
FIG. 1 is a diagram schematically illustrating a functional configuration of a distributed storage system including storage server nodes as an example of an embodiment.
Figure 2:
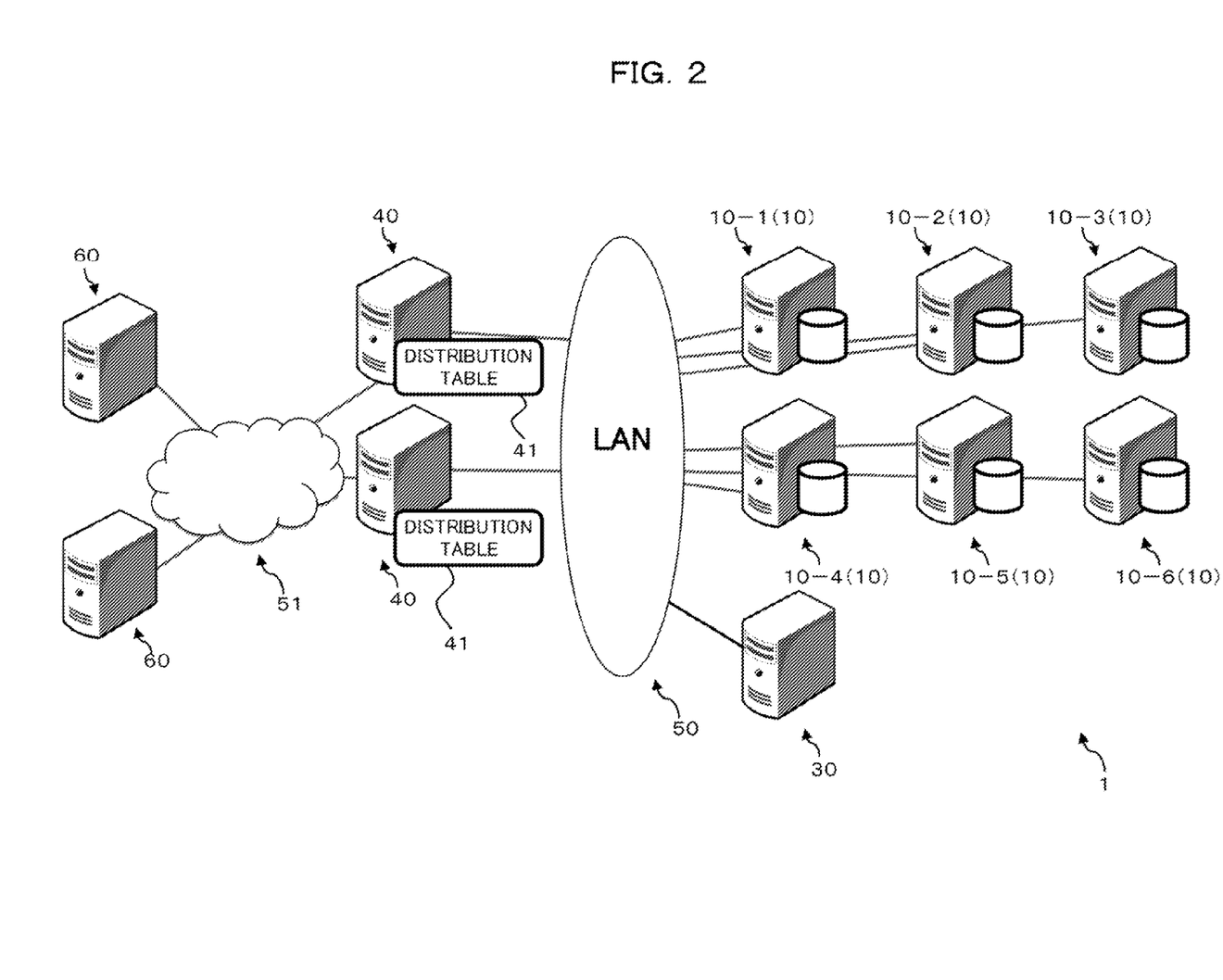
FIG. 2 is a diagram schematically illustrating a configuration of a distributed storage system including storage server nodes as an example of an embodiment.

FIG. 1 is a diagram schematically illustrating a functional configuration of a distributed storage system including storage server nodes as an example of an embodiment, and FIG. 2 is a diagram schematically illustrating a configuration of the distributed storage system including the storage server nodes.

As illustrated in FIG. 2, a distributed storage system 1 includes a management server 30, proxy servers 40, clients 60, and storage server nodes (storage devices, transfer control devices) 10-1 to 10-6. However, for the sake of convenience, the illustration of the clients 60 and the proxy servers 40 is not made in FIG. 1.

In the example illustrated in FIG. 2, the management server 30, the respective storage server nodes 10-1 to 10-6, and the respective proxy servers 40 are communicably connected to each other, for example, through a Local Area Network (LAN) 50. Further, the respective proxy servers 40 and the respective clients 60 are communicably connected to each other through a network 51 such as a public circuit network.

The distributed storage system 1 may collect disk spaces of the respective storage server nodes 10-1 to 10-6 and treat the collected disk spaces as a single storage. In the distributed storage system 1, a plurality of data files are distributively located in the storage server nodes 10-1 to 10-6.

Hereinafter, as reference signs denoting the storage server nodes, reference signs 10-1 to 10-6 are used when it is necessary to specify one of the plurality of storage server nodes, but reference numeral 10 is used to denote arbitrary storage server nodes.

The client 60 is, for example, an information processing device such as a personal computer, and performs a read or write request (read/write request) on a data file (file) stored in the storage server node 10 through the proxy server 40. In the examples illustrated in FIGS. 1 and 2, the distributed storage system 1 includes two clients 60, but the invention is not limited thereto. The distributed storage system 1 may include one client 60 or may include three or more clients 60.

The client 60 transmits a read/write request to the proxy server 40 together with information specifying a data file, for example, a file name (object name) of an access target or the like.

The proxy server 40 performs data access to the storage server node 10 on behalf of the client 60. The respective proxy servers 40 are information processing devices such as computers with a server function, and have the same configuration. In the examples illustrated in FIGS. 1 and 2, the distributed storage system 1 includes two proxy servers 40, but the invention is not limited thereto. The distributed storage system 1 may include one proxy server 40 or may include three or more proxy servers 40.

The proxy servers 40 each include a distribution table 41. The distribution table 41 is configured to associate information specifying a data file with a storage location of the data file. When receiving a read/write request on a data file from the client 60, the proxy server 40 refers to the distribution table 41 based on a received file name, and identifies a storage location of the data file of an access target. The proxy server 40 transmits a read/write request to the storage server node 10 corresponding to the storage location of the data file. Further, when receiving a reply to the read/write request from the storage server node 10, the proxy server 40 transmits the reply to the client 60 that is a transmission source of the read/write request.

Note that, the function of the proxy server 40 may be implemented by a variety of known techniques, and a detailed description thereof will not be made.

The management server 30 is an information processing device such as a computer with a server function, and performs a variety of settings and controls in the distributed storage system 1. Further, the management server 30 has a data management function (data management process) for managing the amount of data retained by each storage server node 10 in the distributed storage system 1. In the embodiment, an example where the distributed storage system 1 includes one management server 30 is illustrated, but the invention is not limited thereto. The distributed storage system 1 may include two or more management servers 30, or the storage server node 10 may share the function of the management server 30.

Each storage server node 10 described later periodically notifies the data amount management process of the management server 30 of a data amount of data retained in a storage unit 14 included in the storage server node 10 (hereinafter, simply referred to as a data amount).

The management server 30 (data amount management process) determines whether or not a data amount bias has occurred between the plurality of storage server nodes 10 included in the distributed storage system 1. For example, the data amount management process calculates an average value of a data amount notified from each storage server node 10, and compares the calculated average value and the amount of data retained by each storage server node 10.

For example, when detecting the storage server node 10, of which the retained data amount is smaller than the average value and a difference between the retained data amount and the average value is larger than or equal to a predetermined threshold value, the data amount management process determines that a data bias has occurred between the storage server nodes 10. Further, the data amount management process determines the storage server node 10, of which the data amount is determined to be smaller than the average value by the predetermined threshold value or more, as the storage server node 10 that will be a transfer destination of a data file. Note that, hereinafter, the storage server node 10 that will be a transfer destination of a data file may sometimes be referred to as a transfer destination node.

Further, for example, the management server 30 instructs the storage server node 10, which is largest in the retained data amount among the plurality of storage server nodes 10 included in the distributed storage system 1, to transfer a data file to the above-described transfer destination node. Hereinafter, the storage server node 10, which is instructed by the management server 30 to transfer a data file, may sometimes be referred to as a transfer source node.

Further, when determining that a data bias has occurred, the management server 30 (data amount management process) determines a difference (X byte) between the calculated average value and the amount of data retained by the transfer destination node as a target data transfer amount (target deletion data size). That is, the target data transfer amount (X byte) is the amount of data to be transferred from a transfer source node to a transfer destination node in order to eliminate a data bias in the distributed storage system 1.

The management server 30 notifies a transfer destination node and a target data transfer amount to a transfer source node, and instructs the transfer source node to transfer a data file corresponding to the target data transfer amount to the transfer destination node.

Each of the storage server nodes 10-1 to 10-6 is an information processing device including a storage unit (data storage unit) 14, and has a storage server function of storing file data in the storage unit 14. The respective storage server nodes 10-1 to 10-6 have the same configuration. Note that, in FIG. 1, for the sake of convenience, a hardware configuration and a functional configuration of only the storage server node 10-1 is illustrated, and the illustration of hardware configurations or functional configurations of the other storage server nodes 10-2 to 10-6 is not made.

In the embodiment, an example where the distributed storage system 1 includes six storage server nodes 10 is illustrated, but the invention is not limited thereto. The distributed storage system 1 may include five or less storage server nodes 10 or may include seven or more storage server nodes 10.

As illustrated in FIG. 1, the storage server node 10 includes a Central Processing Unit (CPU) 11, a Random Access Memory (RAM) 12, a Read Only Memory (ROM) 13, and a storage unit 14.

The storage unit 14 is a storage unit storing a variety of data and programs, and examples of the storage unit 14 is a Hard Disk Drive (HDD) or a Solid State Drive (SSD). Further, as the storage unit 14, for example, Redundant Arrays of Inexpensive Disks (RAIDs) may be configured by a plurality of storage devices, and various modifications may be made thereto.

In the storage unit 14, a data file read/written from each client 60 is stored in the state of data blocks split in a predetermined size. In the storage unit 14, the same data block is not duplicately stored.

Further, the storage unit 14 stores file information 240 and de-duplication information 250.

The file information 240 is information representing a data file stored in the storage server node 10 (for example, a file name). When data file relocation is performed between the storage server nodes 10 by a data redistribution unit 27 described later, and data file transfer is performed, the file information 240 is updated.

The de-duplication information 250 is information about data blocks constituting a data file, and represents data blocks formed by splitting data, a hash key thereof, a data block configuration, or the like. The de-duplication information 250 includes, for example, FP information 250a, data file configuration information 250b, and an index table 250c.

The FP information 250a is information for managing a storage state (storage performance) of block data in the storage unit 14, and a finger print (FP) of respective data blocks constituting a data file is registered therein. For example, when block data is stored in the storage unit 14 described later, information specifying the block data stored in the storage unit 14 is registered in the FP information 250a in association with information identifying a volume thereof.

An FP is created by a technique of obtaining a hash value of a data block, or the like. A de-duplication unit 21 described later uses the FP to determine the match/mismatch of a data block and accordingly determine the duplication of a data block. The FP information 250a may be implemented by using a variety of known techniques, and a detailed description thereof will not be made.

The data file configuration information 250b is information for restoring a data file. For example, the data file configuration information 250b represents the indexes or locations of data blocks constituting a data file (data block pattern). The indexes are identification information that uniquely specifies the data blocks.

Figure 3:
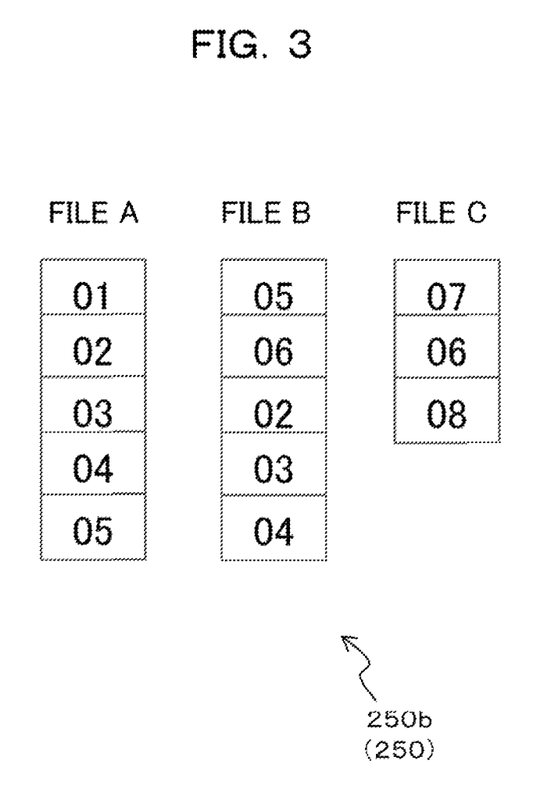
FIG. 3 is a diagram schematically illustrating data file configuration information in a distributed storage system as an example of an embodiment.

FIG. 3 is a diagram schematically illustrating the data file configuration information 250b in the distributed storage system 1 as an example of an embodiment.

In addition, in the example illustrated in FIG. 3, the locations of respective data blocks constituting a file are illustrated in the order of data block arrangement. Specifically, in the example illustrated in FIG. 3, a file A (data file) includes, for example, data blocks represented by indexes 01, 02, 03, 04 and 05. The file A is restored by arranging the data blocks represented by the indexes 01, 02, 03, 04 and 05 in the order illustrated in FIG. 3. Likewise, a file B includes data blocks represented by indexes 05, 06, 02, 03 and 04, and the file B is restored by arranging the data blocks in this order.

In this manner, with reference to the data file configuration information 250b, a data may be restored using the data blocks. Note that, the data file configuration information 250b may be implemented by using a variety of known techniques, and a detailed description thereof will not be made.

Figure 4:
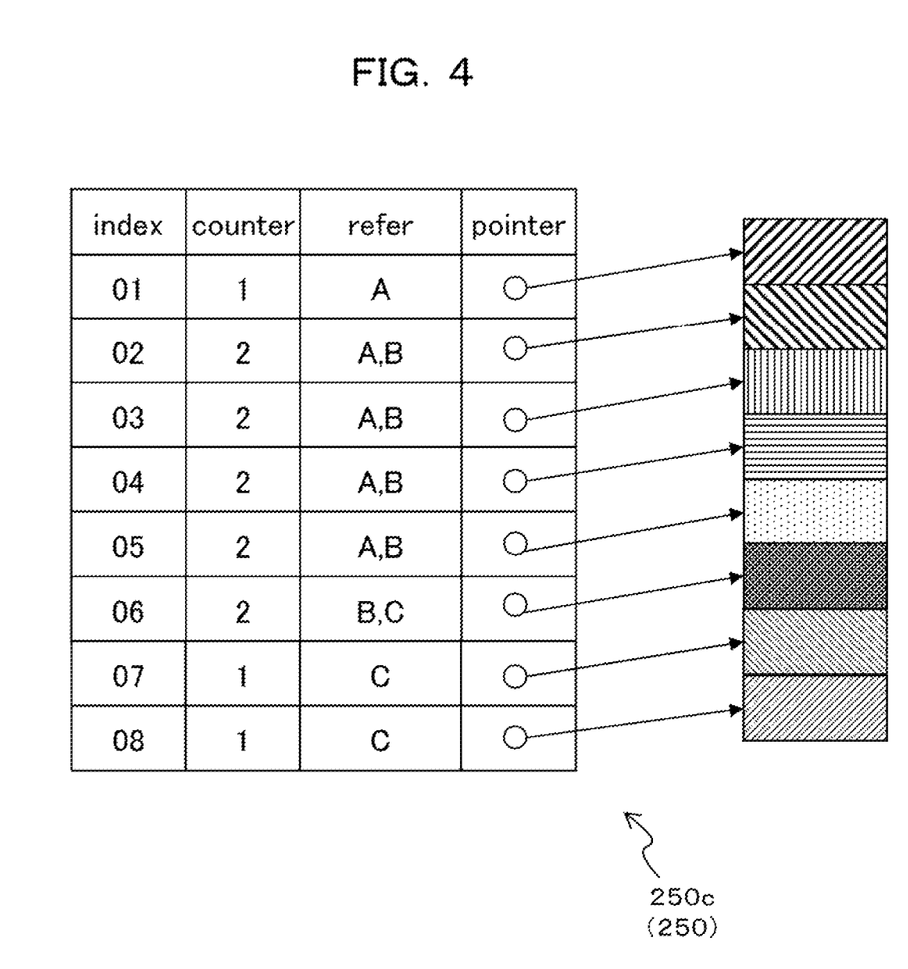
FIG. 4 is a diagram schematically illustrating an index table in a distributed storage system as an example of an embodiment.

FIG. 4 is a diagram schematically illustrating the index table 250c in the distributed storage system 1 as an example of an embodiment.

The index table 250c is information about respective data blocks of a data file stored in the storage server node 10, and represents a duplication relation between the respective data blocks in the storage server node 10. As illustrated in FIG. 4, the index table 250c includes a counter, a refer, and a pointer in association with an index.

The counter is the number of data files (use sources) including (using) the data block in the storage server node 10. Specifically, a value of the counter represents the number of duplications of a data file using the data block (the number of times of duplicate use). When a data block is small in the value of the counter (counter value), it indicates that there are a small number of data files that use (share) the data block.

The refer represents a data file including the data block, and information specifying the data file is stored therein.

For example, in the example illustrated in FIG. 4, a counter "1" and a refer "A" are set for a data block with an index "01". Accordingly, it can be seen that the data block with an index "01" is included only in a file A, that is, one data file. Further, a counter "2" and refers "A and B" are set for a data block with an index "02". Accordingly, it can be seen that the data block with an index "02" is included in two data files, that is, files A and B. The pointer represents a storage location (address or the like) of the data block.

Note that, the above-described de-duplication information 250 is set, for example, by the de-duplication unit 21, which is to be described later.

Note that, the storage server node 10 may include, for example, a display unit and an input unit such as a keyboard and a mouse.

The ROM 13 is a storage unit that stores a variety of data and programs. The RAM 12 is a storage unit that temporarily stores data, programs, or the like when the CPU 11 performs arithmetic processing or the like.

Further, the RAM 12 stores a low count block list 121, a transfer block list 122, a use source list 123, and a deletion block list 124 described later. Note that, the RAM 12 may store the above-described de-duplication information 250 and/or the file information 240.

The CPU 11 performs a variety of operations and controls by executing a variety of programs and an Operating System (OS) stored in the ROM 13 and the storage unit 14. In the storage server node 10, by performing a program stored in the storage unit 14 or the like, the CPU 11 functions as a de-duplication unit 21, a redistribution data selection unit 22, and a data redistribution unit 27 that are illustrated in FIG. 1.

Note that, the program for implementing the functions of the de-duplication unit 21, the redistribution data selection unit 22, and the data redistribution unit 27 may be recorded and provided, for example, in a computer-readable recording medium such as a flexible disk, a CD (such as a CD-ROM, a CD-R, or a CD-RW), a DVD (such as a DVD-ROM, a DVD-RAM, a DVD-R, a DVD+R, a DVD-RW, a DVD+RW, or an HD DVD), a Blu-ray disk, a magnetic disk, an optical disk, or a magneto-optical disk. The computer reads the program from the recording medium and transmits the program to an internal storage unit or an external storage unit for later use. Further, the program may be recorded, for example, in a storage unit (recording medium) such as a magnetic disk, an optical disk, or a magneto-optical disk, and may then be provided from the storage unit through a communication path to the computer.

In order to implement the functions of the de-duplication unit 21, the redistribution data selection unit 22, and the data redistribution unit 27, a program stored in an internal storage unit (the RAM 12 or the ROM 13 in the embodiment) is executed by a microprocessor of the computer (a CPU in the embodiment). At this time, the program recorded in the recording medium may be read and executed by the computer.

Note that, in the embodiment, the computer includes hardware and an operating system, and means hardware that operates under the control of an operating system. Further, when an operating system is not necessary and hardware is operated solely by an application program, the hardware itself corresponds to the computer. The hardware includes at least a microprocessor such as a CPU, and means for reading a computer program recorded in a recording medium. In the embodiment, the storage server node 10 has a function of a computer.

The de-duplication unit 21 splits a data file into a plurality of data blocks, performs de-duplication, and stores data blocks obtained by performing the de-duplication in the storage unit 14.

The de-duplication unit 21 has a function of a data splitting unit that splits a data file into a plurality of data blocks. For example, the de-duplication unit 21 splits a backup data (data file) that is received from an external device (not illustrated) such as a host computer.

The de-duplication unit 21 splits a data file in any one of a variable-length type and a fixed-length type. Here, the fixed-length type is a technique of splitting data by a predetermined size, and the variable-length type is a method of splitting data according to a specific separation rule. Note that, the data splitting by the de-duplication unit 21 may be implemented by a variety of known techniques, and a detailed description thereof will not be made.

Further, the de-duplication unit 21 has a function of a duplicate storage determination unit that determines the match/mismatch of a data block, for example, based on an FP of the data block and accordingly determines the duplication of the data block. In the embodiment, the de-duplication unit 21 determines that data blocks with the same FP are the same data blocks.

For example, when storing a data file in the storage unit 14, the de-duplication unit 21 refers to the FP information 250a with respect to the respective data blocks constituting the data file. Accordingly, it is determined whether or not a data block identical to each data block is stored in the storage unit 14.

Further, for example, when storing the data file in the storage unit 14, if determining that a data block identical to a data block as a processing target is stored in the storage unit 14, the de-duplication unit 21 discards the processing target data block and inhibits the duplicate storage of the processing target data block in the storage unit 14. That is, the de-duplication unit 21 implements de-duplication for storing only one data block with the same FP in one storage unit 14. Only one data block stored in the storage unit 14 is shared by a plurality of data files, so that the de-duplication unit 21 reduces a storage area of the data file. That is, the de-duplication unit 21 functions as a de-duplication engine.

Note that, de-duplication may use, for example, an in-line method that compares data in a control unit of a storage device and stores the data in the storage device. Note that, the invention is not limited thereto, and the de-duplication may use other techniques such as a so-called post process method or a client method, and may be variously modified and implemented.

Further, the de-duplication unit 21 retains an FP performed in each data block and the results of creation of a data block configuration in the FP information 250a, the index table 250c, or the data file configuration information 250b.

In addition, when reading a data file from the storage unit 14, the de-duplication unit 21 reads the de-duplication information 250 about a volume stored in the storage unit 14.

The de-duplication unit 21 restores a volume from a data block in reading data. The de-duplication unit 21 performs data file restoration, for example, by referring to the data file configuration information 250b and using the data block read from the storage unit 14. That is, the de-duplication unit 21 creates a data file by performing data block copy or the like based on the de-duplication information 250. Note that, when a data file is split into data blocks, the data file may sometimes be referred to as a data file including data blocks or a data file using data blocks.

Note that, the data file restoration method using data blocks based on the de-duplication information 250 may be implemented by using a variety of known techniques, and a detailed description thereof will not be made.

When receiving the notification of a transfer destination node and a target data transfer amount from the management server 30, the redistribution data selection unit 22 selects a data file (transfer data file) to be transferred (redistributed) to the transfer destination node among the data files stored in the storage unit 14 of the storage server node 10. That is, in the distributed storage system where a data file is distributively stored in a plurality of storage server nodes 10, the redistribution data selection unit 22 selects a transfer data file to be transferred from one storage server node 10 to another storage server node 10.

The redistribution data selection unit 22 selects a data file (transfer data file) to be transferred from a transfer source node to a transfer destination node, in consideration of a duplication state of data blocks constituting a data file on which de-duplication is performed by the de-duplication unit 21.

The redistribution data selection unit 22 determines a transfer data file by sequentially updating the low count block list 121, the transfer block list 122, the use source list 123, and the deletion block list 124 with reference to the index table 250*c*.

The low count block list 121, the transfer block list 122, the use source list 123, and the deletion block list 124 are stored, for example, in the RAM 12. Further, the redistribution data selection unit 22 updates the index table 250*c*.

The low count block list 121 is a list of identification information (for example, index) of a data block (transfer data block) to be preferentially transferred to a transfer destination node when a transfer data file is selected. The redistribution data selection unit 22 (transfer data block selection unit) preferentially registers a data block, which is small in the number of data files using the data block, as a preferential transfer data block in the low count block list 121. That is, a data block, which is small in terms of the number of times of sharing by data files, is preferentially registered in the low count block list 121.

Specifically, the redistribution data selection unit 22 extracts a data block having a small count value (for example, a count value=1) in the index table 250*c*, and registers the index in the low count block list 121.

The transfer block list 122 is a list of data blocks to be stored in a transfer destination node when a data file is transferred. The use source list 123 is a list of data files including data blocks registered in the transfer block list 122. The deletion block list 124 is a list of data blocks that may be deleted from a transfer source node when a data file is transferred. Data block identification information (for example, index) is also registered in the transfer block list 122 and the deletion block list 124. Hereinafter, registering (setting) a data block index in these lists will be simply referred to as registering a data block.

As illustrated in FIG. 1, the redistribution data selection unit 22 has functions of a transfer data block selection unit 23, a transfer data file selection unit 24, a transfer data block addition unit 25, and a deletion data block selection unit 26.

The transfer data block selection unit 23 selects a preferential transfer data block registered in the low count block list 121 as a transfer data block sequentially from the beginning, and registers the selected transfer data block in the transfer block list 122.

The transfer data file selection unit 24 refers to the refer of the index table 250*c*, selects a data file including (using) the selected preferential transfer data block as a transfer data file, and registers the selected transfer data file in the use source list 123.

The transfer data block addition unit 25 selects all the data blocks included in the selected transfer data file as transfer data blocks, and registers the selected transfer data blocks in the transfer block list 122.

The deletion data block selection unit 26 determines for each transfer data blocks registered in the transfer block list 122, whether or not all the data files including the transfer data block are registered in the use source list 123. This determination is performed, for example, by referring to the refer of the index table 250*c*.

When determining that all the data files including the transfer data block are registered in the use source list 123, the deletion data block selection unit 26 selects the transfer data block as a deletion data block and registers the deletion data block in the deletion block list 124.

The redistribution data selection unit 22 (the transfer data file selection unit 24, the transfer data block addition unit 25, and the deletion data block selection unit 26) performs these determinations and respective list updates with respect to all the transfer data blocks registered in the transfer block list 122.

When a total data size of deletion data blocks registered in the deletion block list 124 satisfies two conditions (data transfer conditions) of the following conditions (a) and (b), the data file registered in the use source list 123 will be a transfer data file. Further, at that time, a data block registered in the transfer block list 122 is stored in a transfer destination node, and a data block registered in the deletion block list 124 is deleted from a transfer source node. Accordingly, the transfer of the transfer data file from the transfer source node to the transfer destination node is achieved.

The data transfer conditions are as follows.

Condition (a): A total data size of deletion data blocks registered in the deletion block list 124 should be a predetermined deletion size.

Here, the deletion size is a data size that is set based on the target data transfer amount (X byte) notified from the management server 30. For example, it may be preferable that the deletion size uses a value having a certain range obtained by adding a predetermined tolerance ($\pm \zeta\%$) to the target data transfer amount.

By satisfying the condition (a), it may be possible to almost satisfy the instruction of the management server 30 to transfer a data file corresponding to the target data transfer amount.

Condition (b): A ratio of a total data size of transfer data blocks registered in the transfer block list 122 to a total data size of deletion data blocks registered in the deletion block list 124 should be smaller than or equal to a predetermined threshold value (first threshold value: 1.2 times for example).

By satisfying the condition (b), it may be possible to prevent an imbalanced state where the data increase amount generated by storing transfer data blocks in the transfer destination node is too large with respect to the data deletion amount obtained by deleting deletion data blocks from the transfer source node. That is, between the transfer source node and the transfer destination node, efficient data transfer may be achieved by balancing the data amount that increases/decreases.

Further, the redistribution data selection unit 22 detects whether or not a total size of deletion data blocks in the deletion block list 124 is larger than or equal to a predetermined threshold value (second threshold value) when a transfer data file is selected.

The second threshold value may be arbitrarily set. For example, the second threshold value may be appropriately set by using a value equal to 1.5 times of the target data transfer amount.

When the total size of the deletion data blocks is larger than or equal to the second threshold value, it is determined that the effect of data amount equalization may not be achieved even when a data file of the use source list 123 is transferred from the transfer source node to the transfer destination node. The redistribution data selection unit 22 reselects another preferential transfer data block from the low count block list 121 and reselects a transfer data file.

The data redistribution unit 27 transfers the transfer data file selected by the redistribution data selection unit 22 from the transfer source node to the transfer destination node. When the total data size of the deletion data blocks registered in the deletion block list 124 described above satisfies the above two conditions (a) and (b), the data redistribution unit 27 transfers the transfer data file registered in the use source list 123 from the transfer source node to the transfer destination node.

Specifically, the data redistribution unit 27 transfers a transfer data block registered in the transfer block list 122 to the transfer destination node and stores the transfer data block in the storage unit 14 of the transfer destination node. Further, the data redistribution unit 27 deletes the deletion data block registered in the deletion block list 124, from the storage unit 14 of the storage server node 10 that is the transfer source node.

The data redistribution unit 27 also stores configuration information of a transfer data file (data file configuration information 250*b*) and information representing a present location of the data file in the transfer destination node.

(B) Operations

Figure 5:
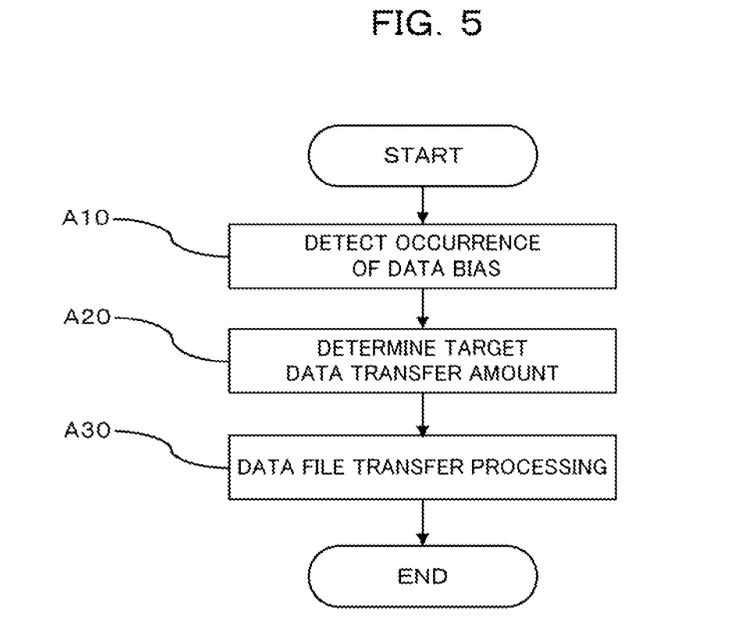
FIG. 5 is a flowchart for describing an overall process for data file transfer in a distributed storage system as an example of an embodiment.

An overall process for data file transfer in the distributed storage system 1 as an example of the embodiment configured as described above will be described with reference to a flowchart (steps A10 to A30) illustrated in FIG. 5.

In the distributed storage system 1, based on the data amounts notified from the respective storage server nodes 10, the management server 30 determines whether or not a data amount bias has occurred between the storage server nodes 10 (step A10).

When detecting that a data amount bias has occurred between the storage server nodes 10, the management server 30 determines a transfer source node and a transfer destination node of a data file and determines a target data transfer amount (step A20). The management server 30 notifies the transfer destination node and the target data transfer amount to the transfer source node and instructs the transfer source node to transfer the data file.

The transfer source node selects a transfer data file to be transferred to the transfer destination node, and transfers the selected transfer data file to the transfer destination node (step A30). Thereafter, the process is ended.

Next, a data file transfer process by the redistribution data selection unit 22 in the distributed storage system 1 as an example of an embodiment will be described with reference to a flowchart (steps S10 to S150) illustrated in FIG. 6. Note that, in an example illustrated below, a parameter "seed" and a parameter "n" are used.

The redistribution data selection unit 22 (transfer data block selection unit 23) performs initialization by setting 1 to n (n=1) (step S10). Thereafter, the redistribution data selection unit 22 extracts a data block with a counter value of n with reference to the index table 250*c* and registers the extracted data block in the low count block list 121 as a preferential transfer data block (step S20).

The transfer data block selection unit 23 determines whether or not a data block is registered in the low count block list 121, that is, whether or not the low count block list 121 is empty (step S30).

When the low count block list 121 is empty (see YES route in step S30), n is incremented (n=n+1) (step S130), and it is determined whether or not n exceeds a predetermined threshold value (third threshold value) (step S140).

Here, the third threshold value is an arbitrarily preset value. By setting the third threshold value, a data file including a data block, of which the number of data files of a use source exceeds the third threshold value, is inhibited from being transferred to a transfer destination.

In the distributed storage system 1, when a data block having a large number of data files of a use source is transferred to the transfer destination node, all the data files using the data block is transferred to the transfer destination node. When all the data files are transferred to the transfer destination node, it is inefficient because there is a risk that a new data bias will occur between the storage server nodes 10.

Thus, efficient data file transfer may be performed by inhibiting a data file, which includes a data block, of which the number of data files of a use source exceeds the third threshold value, from being transferred to the transfer destination.

When n does not exceed the third threshold value (see NO route in step S140), the process returns to step S20. Further, when n exceeds the third threshold value (see YES route in step S140), it is determined that there is no data file to be transferred (no solution) (step S150), and the process is ended.

On the other hand, when the low count block list 121 is not empty (see NO route in step S30), a leading preferential transfer data block of the low count block list 121 is set to a parameter "seed". Further, the preferential transfer data block set to the parameter "seed" is deleted from the low count block list 121 (step S40).

The transfer data block selection unit 23 registers the preferential transfer data block set to the parameter "seed" in the transfer block list 122. Further, the transfer data file selection unit 24 initializes the use source list 123 by emptying the use source list 123, and the deletion data block selection unit 26 initializes the deletion block list 124 by emptying the deletion block list 124 (step S50).

The transfer data file selection unit 24 registers a data file including each data block of the transfer block list 122 in the use source list 123 (step S60).

The redistribution data selection unit 22 determines whether or not a new data file is added to the use source list 123 (step S70). When a new data file is not added to the use source list 123 (see NO route in step S70), the process returns to step S30.

When a new data file is added to the use source list 123 (see YES route in step S70), the transfer data block addition unit 25 registers a data block, which is not registered in the transfer block list 122 while being included in the data file newly added to the use source list 123, in the transfer block list 122 (step S80).

Next, when determining that for each data blocks in the transfer block list 122, all the data files using the data block are registered in the use source list 123, the deletion data block selection unit 26 registers the data block in the deletion data block list 124 (step S90). By transferring all the data files of the use source list 123 to the transfer destination node, the transfer source node has no data file using the data block. Therefore, the data block may be deleted from the transfer source node.

The data redistribution unit 27 determines whether or not a total data size of deletion data blocks registered in the deletion block list 124 satisfies the above-described two data transfer conditions (a) and (b) (step S100). That is, the data redistribution unit 27 determines whether or not the total data size of the deletion data blocks is a predetermined deletion size (condition (a)) and a ratio of a total data size of transfer data blocks to the total data size of the deletion data blocks is smaller than or equal to the first threshold value (condition (b)).

When the data transfer conditions of step S100 are satisfied (see YES route in step S100), the data redistribution unit 27 transfers a data file registered in the use source list 123 from the transfer source node to the transfer destination node (step S110). That is, the data redistribution unit 27 stores a transfer data block of the transfer block list 122 in the transfer destination node, and deletes a deletion data block of the deletion block list 124 from the transfer source node. Thereafter, the process is ended.

On the other hand, when the data transfer conditions of step S100 are not satisfied (see NO route in step S100), the redistribution data selection unit 22 determines whether or not a total size of deletion data blocks in the deletion block list 124 is larger than or equal to the second threshold value (step S120).

When the total size of the deletion data blocks in the deletion block list 124 is smaller than the second threshold value (see NO route in step S120), the process returns to step S60. Further, when the total size of the deletion data blocks in the deletion block list 124 is larger than or equal to the second threshold value (see YES route in step S120), the process returns to step S30.

When the total size of the deletion data blocks is larger than or equal to the second threshold value, there are too many data blocks that are needed to be transferred together with the preferential transfer data block if the preferential transfer data block is transferred to the transfer destination node. Thus, it is determined that the effect of data amount equalization may not be achieved.

(C) Embodiments

Hereinafter, a process of selecting a transfer data file by the redistribution data selection unit 22 in the distributed storage system 1 will be illustrated with reference to the flowchart of FIG. 6.

In an example illustrated below, a technique of selecting a data file to be transferred from a transfer source node, which includes the data files (file A, file B, and file C) illustrated in FIG. 3 and the index table 250c illustrated in FIG. 4, to a transfer destination node will be described.

De-duplication is performed on each of the file A, the file B and the file C. Then, the file A includes data blocks of indexes 01, 02, 03, 04 and 05. Further, the file B includes data blocks of indexes 05, 06, 02, 03 and 04, and the file C includes data blocks of indexes 07, 08 and 09. Further, it is assumed that a data size of each of the data blocks with indexes 01, 02, 03, 04 and 05 is 4 KB.

(C-1) First Embodiment

First, an embodiment where the target data transfer amount is 20 KB (X=20 K) is illustrated.

Figure 6:
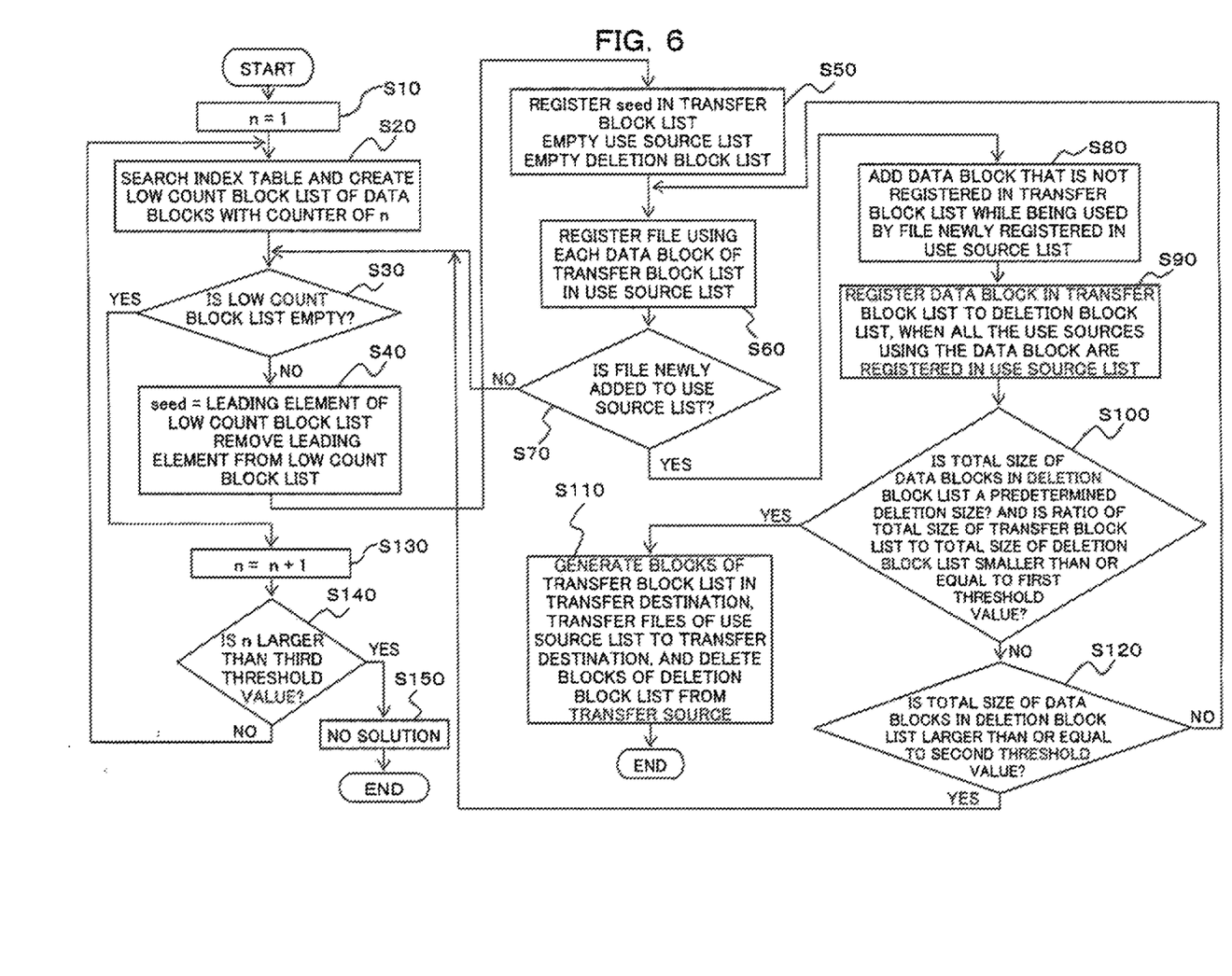
FIG. 6 is a flowchart for describing a data file transfer process by a redistribution data selection unit in a distributed storage system as an example of an embodiment.

(1) n=1 (see step S10 of FIG. 6)

(2) The transfer data block selection unit 23 extracts a data block with a counter value of n from the index table 250c and creates the low count block list 121 (see step S20 of FIG. 6).

Example: indexes 01, 07 and 08 are registered in the low count block list 121 in the order named.

(3) The redistribution data selection unit 22 performs the following process on each preferential transfer data block (element) of the low count block list 121. Note that, in an embodiment described below, the respective entries of the transfer block list 122, the use source list 123, and the deletion block list 124 are represented in parentheses "( )" arranged in the order of the transfer block list 122, the use source list 123, and the deletion block list 124.

(3-1) The transfer data file selection unit 24 registers a data file including each data block of the transfer block list 122 in the use source list 123 (see step S60 of FIG. 6). When there is no data file to be newly registered in the use source list 123 (see the NO route in step S70 of FIG. 6), the process proceeds to a next element of the low count block list 121.

Example: (01) (FileA) ( )

(3-2) The transfer data block addition unit 25 adds a data block, which is not registered in the transfer block list 122 while being included in a data file newly registered in the use source list 123, to the transfer block list 122 (see step S80 of FIG. 6).

Example: (01, 02, 03, 04, 05) (FileA) ( )

(3-3) When for each data blocks in the transfer block list 122, all the data files (use sources) using the data block are registered in the use source list 123, the deletion data block selection unit 26 registers the data block in the deletion block list 124 (see step S90 of FIG. 6).

Example: (01, 02, 03, 04, 05) (FileA) (01)

(3-4) It is determined whether or not a total size of data blocks in the deletion block list 124 is a desired deletion size and a ratio of a total size (transfer amount) of the transfer block list 122 to a total size (deletion amount) of the deletion block list 124 is smaller than or equal to the first threshold value (for example, 1.2 times) (see step S100 of FIG. 6). When the transfer conditions are satisfied (see the YES route of step S100 of FIG. 6), the data redistribution unit 27 generates a data block of the transfer block list 122 in the transfer destination node and deletes a data block of the deletion block list 124 from the transfer source node. Accordingly, the file of the use source list 123 is transferred from the transfer source node to the transfer destination node (see step S110 of FIG. 6).

Example: Data Deletion Amount (Deletion Amount) in Transfer Source Node=4 KB

Data Increase Amount (Transfer Amount) in Transfer Destination Node=20 KB

In the embodiment, the transfer conditions are not satisfied.

(3-5) When the total size of data blocks in the deletion block list 124 is larger than or equal to the second threshold value (for example, 1.5 times of the target data transfer amount), the processing of the preferential transfer data block is ended (see step S120 of FIG. 6).

Example: 4<20×1.5

(3-6) In the embodiment described in the (3-5), since the total size of data blocks in the deletion block list 124 is not larger than or equal to the second threshold value (for example, 1.5 times of the target data transfer amount) (see the NO route of step S120 of FIG. 6), the process returns to the (3-1).

(3-1') The transfer data file selection unit 24 registers a data file including each data block of the transfer block list 122 in the use source list 123 (see step S60 of FIG. 6).

Example: (01, 02, 03, 04, 05) (FileA, FileB) (01)

(3-2') In the embodiment described in the (3-1'), since a new file B is registered in the use source list 123, the transfer data block addition unit 25 adds a data block, which is not registered in the transfer block list 122 while being included in a data file newly registered in the use source list 123, to the transfer block list 122 (see step S80 of FIG. 6).

Example: (01, 02, 03, 04, 05, 06) (FileA, FileB) (01)

(3-3') When for each data blocks in the transfer block list 122, all the data files (use sources) using the data block are registered in the use source list 123, the deletion data block selection unit 26 registers the data block in the deletion block list 124 (see step S90 of FIG. 6).

Example: (01, 02, 03, 04, 05, 06) (FileA, FileB) (01, 02, 03, 04, 05)

(3-4') It is determined whether or not a total size of data blocks in the deletion block list 124 is a desired deletion size and a ratio of a total size (transfer amount) of the transfer block list 122 to a total size (deletion amount) of the deletion block list 124 is smaller than or equal to the first threshold value (for example, 1.2 times) (see step S100 of FIG. 6).

Example: Data Deletion Amount (Deletion Amount) in Transfer Source Node=20 KB

Data Increase Amount (Transfer Amount) in Transfer Destination Node=24 KB

In the embodiment, since the transfer amount/deletion amount satisfies the transfer conditions (see the YES route of step S100 of FIG. 6), the data redistribution unit 27 generates data blocks 01, 02, 03, 04, 05 and 06 of the transfer block list 122 in the transfer destination node and deletes data blocks 01, 02, 03, 04 and 05 of the deletion block list 124 from the transfer source node. Accordingly, the file A and the file B of the use source list 123 are transferred from the transfer source node to the transfer destination node (see step S110 of FIG. 6). Thereafter, the process is ended.

(C-2) Second Embodiment

Next, an embodiment where the target data transfer amount is 8 KB (X=8K) is described. Further, a case where an index 07 is first selected as a preferential transfer data block is illustrated.

In the embodiment, it is also assumed that a data size of each data block is 4 KB.

(1) n=1 (see step S10 of FIG. 6)

(2) The transfer data block selection unit 23 extracts a data block with a counter value of n from the index table 250c and creates the low count block list 121 (see step S20 of FIG. 6).

Example: indexes 07, 06 and 08 are registered in the low count block list 121 in the order named.

(3) The redistribution data selection unit 22 performs the following process on each preferential transfer data block (element) of the low count block list 121.

(3-1) For each data block in the transfer block list 122, the transfer data file selection unit 24 registers a data file including the data block in the use source list 123 (see step S60 of FIG. 6). When there is no data file to be newly registered in the use source list 123 (see the NO route in step S70 of FIG. 6), the process proceeds to a next element of the low count block list 121.

Example: (07) (FileC) ( )

(3-2) The transfer data block addition unit 25 adds a data block, which is not registered in the transfer block list 122 while being included in a data file newly registered in the use source list 123, to the transfer block list 122 (see step S80 of FIG. 6).

Example: (07, 06, 08) (FileC) ( )

(3-3) When for each data block in the transfer block list 122, all the data files (use sources) using the data block are registered in the use source list 123, the deletion data block selection unit 26 registers the data block in the deletion block list 124 (see step S90 of FIG. 6).

Example: (07, 06, 08) (FileC) (07, 08)

(3-4) It is determined whether or not a total size of data blocks in the deletion block list 124 is a desired deletion size and a ratio of a total size (transfer amount) of the transfer block list 122 to a total size (deletion amount) of the deletion block list 124 is smaller than or equal to the first threshold value (for example, 1.2 times) (see step S100 of FIG. 6). When the transfer conditions are satisfied (see the YES route in step S100 of FIG. 6), the data redistribution unit 27 generates a data block of the transfer block list 122 in the transfer destination node and deletes a data block of the deletion block list 124 from the transfer source node. Accordingly, the file of the use source list 123 is transferred from the transfer source node to the transfer destination node (see step S110 of FIG. 6).

Example: Data Deletion Amount (Deletion Amount) in Transfer Source Node=8 KB

Data Increase Amount (Transfer Amount) in Transfer Destination Node=12 KB

In the embodiment, the transfer conditions are not satisfied.

(3-5) It is determined whether or not a total size of data blocks in the deletion block list 124 is larger than or equal to the second threshold value (for example, 1.5 times of the target data transfer amount).

Example: 8<12×1.5

(3-6) In the embodiment described in the (3-5), since the total size of data blocks in the deletion block list 124 is not larger than or equal to the second threshold value (for example, 1.5 times of the target data transfer amount) (see the NO route in step S120 of FIG. 6), the process returns to the (3-1).

(3-1') The transfer data file selection unit 24 registers a data file including each data block of the transfer block list 122 in the use source list 123 (see step S60 of FIG. 6).

Example: (07, 06, 08) (FileC, FileB) (07, 08)

(3-2') In the embodiment described in the (3-1'), since new file B is registered in the use source list 123, the transfer data block addition unit 25 adds a data block, which is not registered in the transfer block list 122 while being included in a data file newly registered in the use source list 123, to the transfer block list 122 (see step S80 of FIG. 6).

Example: (07, 06, 08, 05, 02, 03, 04) (FileC, FileB) (07, 08)

(3-3') When for each data block in the transfer block list 122, all the data files (use sources) using the data block are registered in the use source list 123, the deletion data block selection unit 26 registers the data block in the deletion block list 124 (see step S90 of FIG. 6).

Example: (07, 06, 08, 05, 02, 03, 04) (FileC, FileB) (07, 08, 06)

(3-4') It is determined whether or not a total size of data blocks in the deletion block list 124 is a desired deletion size and a ratio of a total size (transfer amount) of the transfer block list 122 to a total size (deletion amount) of the deletion block list 124 is smaller than or equal to the first threshold value (for example, 1.2 times) (see step S100 of FIG. 6).

Example: Data Deletion Amount (Deletion Amount) in Transfer Source Node=12 KB

Data Increase Amount (Transfer Amount) in Transfer Destination Node=28 KB

In the embodiment, the transfer amount/deletion amount does not satisfy the transfer conditions (see the NO route in step S100 of FIG. 6).

(3-5') It is determined whether or not a total size of data blocks in the deletion block list 124 is larger than or equal to the second threshold value (for example, 1.5 times of the target data transfer amount) (see step S120 of FIG. 6). In the embodiment, 12=8×1.5, and the process is ended, failing to find a solution.

(D) Effects

According to the distributed storage system 1, in each storage server node 10, the redistribution data selection unit 22 selects a data file to be transferred to a transfer destination node, and the data redistribution unit 27 transfers data blocks constituting the selected data file to the transfer destination node. In particular, when all the data files using a transfer data block of the transfer block list 122 are registered as transfer data files, the transfer data block of the transfer block list 122 is stored in the transfer destination node, and a deletion data block of the deletion block list 124 is deleted from a destination source node. Accordingly, data amounts may be equalized between the storage server nodes 10.

Further, in the distributed storage system 1, the de-duplication unit 21 implements a de-duplication process in each storage server node 10. Therefore, the amount of data stored in each storage server node 10 may be reduced, and the storage area of the storage unit 14 may be efficiently used. That is, de-duplication may be performed in each storage server node 10, and data amount equalization may be achieved between the storage server nodes 10.

Here, a case of applying de-duplication to a conventional distributed storage system and performing data relocation is considered.

Figure 7A:
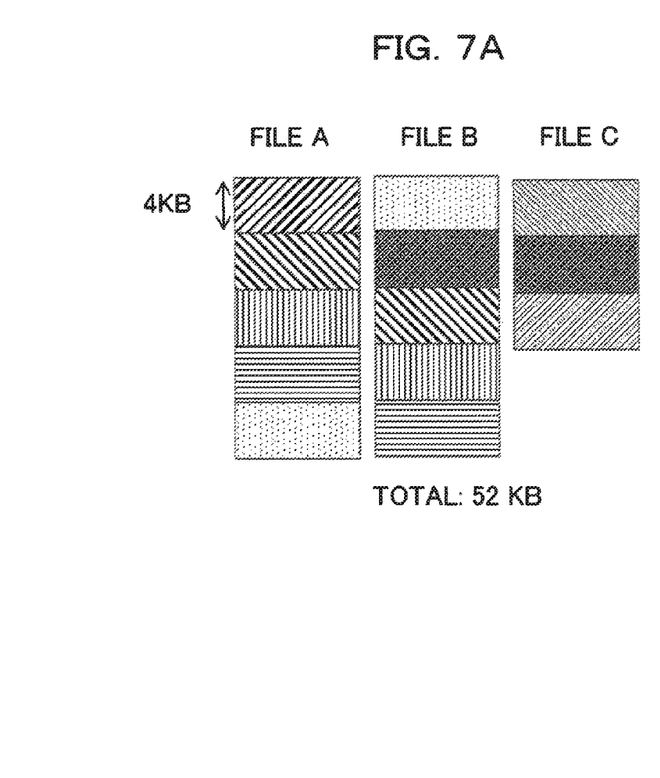
FIGS. 7A and 7B are diagrams describing a conventional de-duplication technique.
Figure 7B:
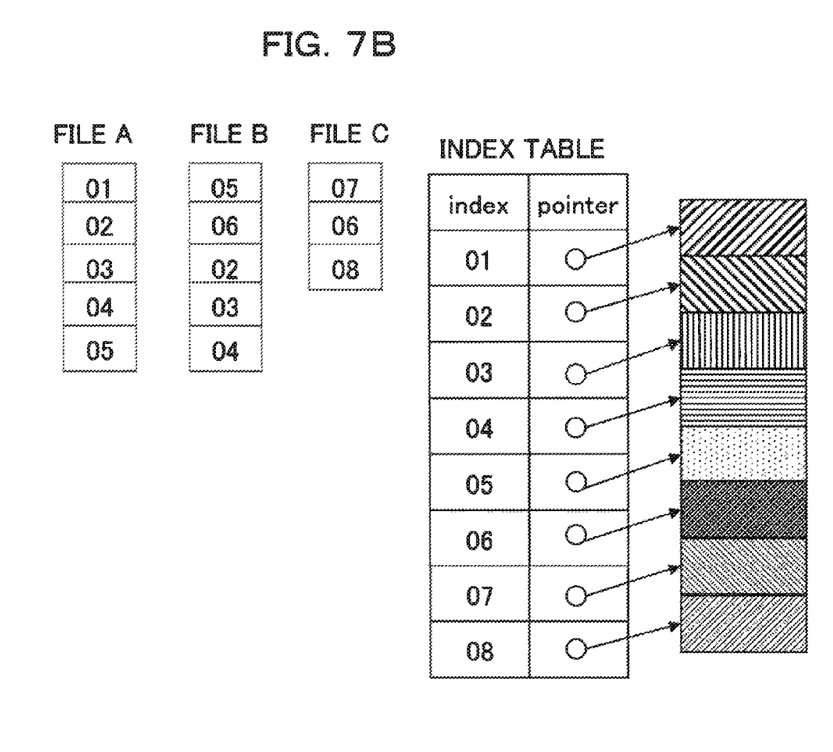

FIGS. 7A and 7B are diagrams describing a conventional de-duplication technique. FIG. 7A is a diagram illustrating a file configuration, and FIG. 7B is a diagram illustrating a state where de-duplication has been performed on each data file illustrated in FIG. 7A.

In an example illustrated in FIGS. 7A and 7B, a file A includes data blocks represented by indexes 01, 02, 03, 04 and 05. Likewise, a file B includes data blocks represented by indexes 05, 06, 02, 03 and 04, and a file C includes data blocks represented by indexes 07, 06 and 08. It is assumed that a data size of each data block is 4 KB.

By de-duplicating the files A, B and C with a total data amount of 52 KB illustrated in FIG. 7A, a data size may be reduced by about the sum ((32+α) KB) of 32 KB and an index table (α KB) as illustrated in FIG. 7B.

In the conventional distributed storage system, when each data file de-duplicated as illustrated in FIG. 7B is selected as a relocation target and is simply transferred to a transfer destination node, data distribution may not be efficiently performed.

For example, in the embodiment of FIG. 7B, when the file A is transferred to a transfer destination node, data blocks represented by indexes 01, 02, 03, 04 and 05 are newly stored in the transfer destination node, so that the data amount increases by 20 KB.

On the other hand, in a transfer source node, since data blocks represented by indexes 02, 03, 04 and 05 are also used by the other files B and C, the data blocks may not be deleted from the transfer source node. Therefore, in the transfer source node, since only a data block of an index 01 used only by the data file A may be deleted, the data amount is reduced by 4 KB by transferring the data file A.

Likewise, when the file B is transferred to a transfer destination node, data blocks represented by indexes 05, 06, 02, 03 and 04 are newly stored in the transfer destination node, so that the data amount increases by 20 KB. On the other hand, since data blocks represented by indexes 05, 06, 02, 03 and 04 are also used by the other files A and B, the data blocks may not be deleted from a transfer source node. That is, in the transfer source node, a data amount reduced by transferring the data file B is 0 KB.

In this manner, when de-duplication is applied to the conventional distributed storage system, even when data relocation is performed to transfer a data file from a transfer source node to a transfer destination node, data reduction may not be performed in the transfer source node, so that data amount equalization may not be achieved by data relocation. Further, when data relocation is performed, the data amount increases in the entire distributed storage system, so that the effect of de-duplication is inhibited.

Note that, a method of sharing and configuring a de-duplication index between storage server nodes may be considered. However, when the index is shared/managed between a plurality of storage server nodes, performance degradation may occur and thus it may be impossible to utilize the merit of a distributed storage.

In the distributed storage system 1, de-duplication by the de-duplication unit 21 may be achieved in each storage server node 10, and data equalization may be achieved between the storage server nodes 10.

Further, according to the distributed storage system 1, a data block with a small counter value is preferentially registered in the low count block list 121 as a preferential transfer data block, and a data file using the data block registered in the low count block list 121 is selected as a transfer data file. Accordingly, data amount equalization may be efficiently achieved by data file transfer.

Further, when the data transfer conditions including the conditions (a) and (b) are satisfied, the data redistribution unit 27 transfers a data file of the use source list 123 from a transfer source node to a transfer destination node.

Here, by satisfying the condition (a) prescribing that a total data size of deletion data blocks be a predetermined deletion size, it may be possible to almost satisfy the instruction of the management server 30 to transfer a data file corresponding to the target data transfer amount.

Further, by satisfying the condition (b) prescribing that a ratio of a total data size of transfer data blocks to a total data size of deletion data blocks be less than or equal to the predetermined first threshold value, it may be possible to achieve efficient data transfer between the transfer source node and the transfer destination node by balancing the data amount that increases/decreases.

(E) Others

The disclosed technology is not limited to the embodiments described above, and may be variously modified and implemented without departing from the purports of the embodiments. The respective configurations and processes of the embodiments may be selected or appropriately combined as necessary.

For example, in the above-described embodiments, the management server 30 (data amount management process) determines the storage server node 10, of which the data retention amount is smaller than an average value and the difference between the data retention amount and the average value is larger than or equal to a predetermined threshold value, as a transfer destination node. Further, the difference (X byte) between the calculated average value and the data retention amount of the transfer destination node is set as the target data transfer amount, but the invention is not limited thereto.

For example, the storage server node 10, of which the data retention amount is larger than the average value and the difference between the data retention amount and the average value is larger than or equal to the predetermined threshold value, may be determined as a transfer source node. Further, the difference (X byte) between the calculated average value and the data retention amount of the transfer source node may be set as the target data transfer amount. In this case, for example, it may be preferable that the storage server node 10 having the smallest data retention amount among all the storage server nodes 10 be determined as a transfer destination node.

Further, for example, instead of determining a transfer destination node, a transfer source node, and a target data transfer amount by the management server 30, each storage server node 10 may determine the transfer destination node, the transfer source node, and the target data transfer amount.

Specifically, for example, the respective data retention amounts are notified between the respective storage server nodes 10, so that each storage server node 10 knows the data retention amounts of the other storage server nodes 10. Further, the average value of data amounts of all the storage server nodes 10 may be calculated, and a data bias may be detected when the difference between the calculated average value and the data retention amount of each storage server node 10 is larger than or equal to a predetermined threshold value.

In this case, when the data retention amount of the storage server node 10 detecting the data bias is larger than the average value of all the storage server nodes 10, the storage server node 10 is determined as a transfer source node. Further, when the data retention amount of the storage server node 10 detecting the data bias is smaller than the average value of all the storage server nodes 10, the storage server node 10 is determined as a transfer destination node. Further, for example, it may be preferable that the difference between the calculated average value and the data retention amount of the storage server node itself be set as the target data transfer amount.

Further, those skilled in the art may implement/manufacture the embodiments based on the above-described disclosure.

According to the invention, data amounts may be equalized between a plurality of nodes.

All examples and conditional language recited herein are intended for the pedagogical purposes of aiding the reader in understanding the invention and the concepts contributed by the inventor to further the art, and are to be construed limitations to such specifically recited examples and conditions, nor does the organization of such examples in the specification relate to a showing of the superiority and inferiority of the invention. Although one or more embodiments of the inventions have been described in detail, it should be understood that the various changes, substitutions, and alterations could be made hereto without departing from the spirit and scope of the invention.

What is claimed is:

1. A transfer control device that is provided in a distributed storage system, the transfer control device comprising:
   a memory; and
   a processor configured to:
      store, for each of a plurality of data blocks generated by dividing a data file among a plurality of data files, data block count information that is used to count a number of occurrence of that particular data block in the plurality of data files in the memory;
      select a transfer data block among the plurality of data blocks, when there is an imbalance in respective amounts of data stored in nodes of a plurality of nodes in the distributed storage system, in an ascending order of the number of occurrence of the selected data block in data files among the plurality of data files, based on the data block count information, for relocating the data file in order to correct the imbalance, from a source node to a destination node, among the plurality of nodes;
      select the data file and at least one different data file including a same content as the selected transfer data block as transfer data files;
      add all data blocks included in the transfer data files to the transfer data block;
      select the transfer data block as a deletion data block, when all the data files including the transfer data block are selected as the transfer data files; and
      transfer the data files from the source node to the destination node by storing the transfer data block in the destination node and deleting the deletion data block from the source node.

2. The transfer control device according to claim 1, wherein when a total data amount of the deletion data block is larger than or equal to a predetermined target deletion data amount and a ratio of a total data amount of the transfer data block to a total data amount of the deletion data block is smaller than or equal to a predetermined value, the processor transfers the data files from the source node to the destination node.

3. A non-transitory computer-readable storage medium storing a program causing a computer that is provided in a distributed storage system, to execute the processing of:
   storing, for each of a plurality of data blocks generated by dividing a data file among a plurality of data files, data block count information that is used to count a number of occurrence of that particular data block in the plurality of data files in the memory;
   selecting a transfer data block among the plurality of data blocks, when there is an imbalance in respective amounts of data stored in nodes of a plurality of nodes in the distributed storage system, in an ascending order of the number of occurrence of the selected data block in data files among the plurality of data files, based on the data block count information, for relocating the data file in order to correct the imbalance, from a source node to a destination node, among the plurality of nodes;
   selecting the data file and at least one different data file including a same content as the selected transfer data block as transfer data files;
   adding all data blocks included in the selected transfer data files to the transfer data block;
   selecting the transfer data block as a deletion data block, when all the data files including the transfer data block are selected as the transfer data files; and
   transferring the data files from the transfer source node to the destination node by storing the transfer data block in the destination node and deleting the deletion data block from the source node.

4. The non-transitory computer-readable storage medium according to claim 3, wherein when a total data amount of the deletion data block is larger than or equal to a predetermined target deletion data amount and a ratio of a total data amount of the transfer data block to a total data amount of the deletion data block is smaller than or equal to a predetermined value, the data file is transferred from the source node to the destination node.

5. A storage apparatus that is provided in a distributed storage system, the storage apparatus comprising:
   a data storage unit capable of storing a plurality of data files;
   a memory; and
   a processor, the processor being configured to:
      generate a plurality of data blocks by dividing a data file among the plurality of data files, perform de-duplication between the generated data blocks, and store the de-duplicated data blocks in the data storage unit;
      store, for each of the plurality of data blocks, data block count information that is used to count a number of occurrence of that particular data block in the plurality of data files in the memory;

select a transfer data block among the plurality of data blocks, when there is an imbalance in respective amounts of data stored in nodes of a plurality of nodes in the distributed storage system, in an ascending order of the number of occurrence of the selected data block in data files among the plurality of data files, based on the data block count information, the transfer data block to be transferred from a source node to a destination node in order to correct the imbalance;

select the data file and at least one different data file including a same content as the selected transfer data block as transfer data files;

add all data blocks included in the selected transfer data files to the transfer data block;

select the transfer data block as a deletion data block, when all the data files including the transfer data block are selected as the transfer data files; and transfer the data files from the source node to the destination node by storing the transfer data block in the node and deleting the deletion data block from the source node.

6. The storage apparatus according to claim 5, wherein when a total data amount of the deletion data block is larger than or equal to a predetermined target deletion data amount and a ratio of a total data amount of the transfer data block to a total data amount of the deletion data block is smaller than or equal to a predetermined value, the processor transfers the data files from the source node to the transfer node.

* * * * *